(12) United States Patent
Diestelhorst et al.

(10) Patent No.: US 10,572,299 B2
(45) Date of Patent: Feb. 25, 2020

(54) SWITCHING BETWEEN THREAD MODE AND TRANSACTION MODE FOR A SET OF REGISTERS

(71) Applicant: ARM LIMITED, Cambridge (GB)

(72) Inventors: Stephan Diestelhorst, Cambridge (GB); Matthew James Horsnell, Cambridge (GB); Guy Larri, Cambridge (GB)

(73) Assignee: ARM Limited, Cambridge (GB)

( * ) Notice: Subject to any disclaimer, the term of this patent is extended or adjusted under 35 U.S.C. 154(b) by 126 days.

(21) Appl. No.: 15/531,836

(22) PCT Filed: Nov. 24, 2015

(86) PCT No.: PCT/GB2015/053569
§ 371 (c)(1),
(2) Date: May 31, 2017

(87) PCT Pub. No.: WO2016/097680
PCT Pub. Date: Jun. 23, 2016

(65) Prior Publication Data
US 2017/0329626 A1    Nov. 16, 2017

(30) Foreign Application Priority Data
Dec. 19, 2014 (GB) .................................. 1422793.8

(51) Int. Cl.
*G06F 9/46* (2006.01)
*G06F 9/52* (2006.01)
(Continued)

(52) U.S. Cl.
CPC ............ *G06F 9/467* (2013.01); *G06F 9/3851* (2013.01); *G06F 9/462* (2013.01); *G06F 9/5016* (2013.01); *G06F 9/528* (2013.01); *G06F 9/3867* (2013.01)

(58) Field of Classification Search
None
See application file for complete search history.

(56) References Cited

U.S. PATENT DOCUMENTS 7,861,128 B1 * 12/2010 Moore ............. G01R 31/31854
714/30
2004/0103410 A1 * 5/2004 Sakai ....................... G06F 8/456
717/146

(Continued)

OTHER PUBLICATIONS

International Search Report for PCT/GB2015/053569, dated Feb. 22, 2016, 3 pages.
(Continued)

*Primary Examiner* — Abu Zar Ghaffari
(74) *Attorney, Agent, or Firm* — Nixon & Vanderhye P.C.

(57) ABSTRACT

An apparatus (2) has processing circuitry (6) having access to a first processing resource (20-0) and a second processing resource (20-3). A first thread can be processed using the first processing resource. In a thread mode the second processing resource (20-3) can be used to process a second thread while in a transaction mode the second processing resource (20-3) can be used to process a transaction of the first thread comprising a number of speculatively performed operations for which results are committed at the end of the transaction. By sharing resources for supporting additional threads and supporting transactions, circuit area and power consumption can be reduced.

14 Claims, 5 Drawing Sheets

(51) Int. Cl.
*G06F 9/50* (2006.01)
*G06F 9/38* (2018.01)

(56) References Cited

U.S. PATENT DOCUMENTS

| | | | |
|---|---|---|---|
| 2005/0149697 A1* | 7/2005 | Enright | G06F 9/3009 |
| | | | 712/214 |
| 2007/0198792 A1* | 8/2007 | Dice | G06F 9/466 |
| | | | 711/163 |
| 2007/0266197 A1* | 11/2007 | Neyama | G06F 3/0613 |
| | | | 710/310 |
| 2008/0216073 A1* | 9/2008 | Yates | G06F 9/30174 |
| | | | 718/100 |
| 2008/0288726 A1 | 11/2008 | Heller, Jr. | |
| 2009/0217013 A1* | 8/2009 | Caprioli | G06F 9/30123 |
| | | | 712/228 |
| 2010/0023707 A1* | 1/2010 | Hohmuth | G06F 9/466 |
| | | | 711/152 |
| 2010/0162247 A1 | 6/2010 | Welc et al. | |
| 2010/0186015 A1 | 7/2010 | Wang | |
| 2011/0145552 A1* | 6/2011 | Yamada | G06F 9/30076 |
| | | | 712/228 |
| 2011/0145637 A1* | 6/2011 | Gray | G06F 11/141 |
| | | | 714/15 |
| 2011/0153960 A1* | 6/2011 | Rajwar | G06F 9/466 |
| | | | 711/154 |
| 2011/0173392 A1* | 7/2011 | Gara | G06F 9/3004 |
| | | | 711/122 |
| 2012/0005461 A1* | 1/2012 | Moir | G06F 9/3863 |
| | | | 712/228 |
| 2012/0084477 A1* | 4/2012 | Arndt | G06F 9/466 |
| | | | 710/266 |
| 2012/0110271 A1* | 5/2012 | Boersma | G06F 9/3012 |
| | | | 711/147 |
| 2013/0019083 A1 | 1/2013 | Cain, III et al. | |
| 2013/0297967 A1 | 11/2013 | Heller, Jr. | |
| 2013/0339327 A1* | 12/2013 | Belmar | G06F 9/466 |
| | | | 707/703 |
| 2013/0339963 A1* | 12/2013 | Greiner | G06F 9/466 |
| | | | 718/102 |
| 2014/0033217 A1 | 1/2014 | Vajda et al. | |
| 2014/0281236 A1* | 9/2014 | Rash | G06F 9/467 |
| | | | 711/122 |
| 2015/0052315 A1* | 2/2015 | Ghai | G06F 9/467 |
| | | | 711/145 |
| 2015/0074676 A1* | 3/2015 | Maruyama | G06F 9/4881 |
| | | | 718/103 |
| 2015/0277919 A1* | 10/2015 | Bradbury | G06F 9/3851 |
| | | | 712/215 |
| 2015/0347133 A1* | 12/2015 | Gschwind | G06F 9/30058 |
| | | | 712/239 |
| 2017/0046182 A1* | 2/2017 | Kogan | G06F 9/44552 |

OTHER PUBLICATIONS

Written Opinion of the ISA for PCT/GB2015/053569, dated Feb. 22, 2016, 8 pages.
Search Report for GB 1422793.9, dated Jun. 19, 2015, 6 pages.

* cited by examiner

SWITCHING BETWEEN THREAD MODE AND TRANSACTION MODE FOR A SET OF REGISTERS

This application is the U.S. national phase of International Application No. PCT/GB2015/053569 filed 24 Nov. 2015, which designated the U.S. and claims priority to GB Patent Application No. 1422793.8 filed 19 Dec. 2014, the entire contents of each of which are hereby incorporated by reference.

The present technique relates to the field of data processing.

Some data processing apparatuses may support processing of transactions in which a number of data processing operations (typically including data access operations such as loads and stores) are performed speculatively following a transaction start event. The results of the speculatively performed operations are committed following a transaction end event. The speculative results of the processing operations performed for the transaction may be discarded if an abort event occurs before the transaction end event, triggering the transaction to be aborted. This mechanism may be useful for implementing exclusive access to areas of memory or data, for example. However, the resources required to support processing of transactions may require a significant circuit area and energy overhead.

Viewed from one aspect, the present technique provides an apparatus comprising:
processing circuitry to perform data processing;
wherein the processing circuitry has access to a first processing resource and a second processing resource;
the processing circuitry is to process a first thread using the first processing resource;
in a thread mode of the second processing resource, the processing circuitry is to process a second thread using the second processing resource; and
in a transaction mode of the second processing resource, the processing circuitry is to process a transaction of the first thread using the second processing resource, the transaction comprising one or more data processing operations of the first thread performed speculatively by the processing circuitry following a transaction start event, for which results of the speculatively performed data processing operations are committed in response to a transaction end event.

Viewed from another aspect, the present technique provides an apparatus comprising:
processing means for performing data processing;
wherein the processing means has access to first and second processing resource means for supporting the data processing;
the processing means is to process a first thread using the first processing resource means;
in a thread mode of the second processing resource means, the processing means is to process a second thread using the second processing resource means; and
in a transaction mode of the second processing resource means, the processing means is to process a transaction of the first thread using the second processing resource means, the transaction comprising one or more data processing operations of the first thread performed speculatively by the processing means following a transaction start event, for which results of the speculatively performed data processing operations are committed in response to a transaction end event.

Viewed from a further aspect, the present technique provides a data processing method for an apparatus comprising processing circuitry having access to a first processing resource and a second processing resource, the method comprising:
processing a first thread with the processing circuitry using the first processing resource;
when the second processing resource is in a thread mode, processing a second thread with the processing circuitry using the second processing resource; and
when the second processing resource is in a transaction mode, processing a transaction of the first thread with the processing circuitry using the second processing resource, the transaction comprising one or more data processing operations of the first thread performed speculatively by the processing circuitry following a transaction start event, for which results of the speculatively performed data processing operations are committed in response to a transaction end event.

Further aspects, features and advantages of the present technique will be apparent from the following description of examples, which is to be read in conjunction with the accompanying drawings, in which.

Processing of transactions may require certain processing resources to be made available to the processing circuitry. For example, various storage structures may be used to track results of speculatively performed data processing operations or to store previous versions of data which might need to be restored if a transaction is aborted. These resources may be relatively expensive in terms of area and power consumption, especially for a relatively small processing element. A processing circuit may also have resources for supporting execution of multiple threads of processing. For example storage structures may be provided for storing state data for each thread so that the processing circuitry can switch execution between different threads relatively efficiently without needing a large amount of state data to be fetched from memory. Hence, both support for multithreading and support for processing of transactions may require some additional processing resource. The inventors recognised that some such processing resources may be shared between handling of multiple threads and handling of transactions, so that it is not necessary to provide separate resources for each thread as well as additional resources for handling transactions. By reducing the amount of resource required, which can be costly to maintain, the overall apparatus can have less circuit area and consume less power.

Hence, a processing circuit may have access to a first processing resource and a second processing resource (which could be within the processing circuitry, or could be an external resource). A first thread may be processed using the first processing resource. The second processing resource may have a thread mode and a transaction mode. In the thread mode, the processing circuitry may process a second thread using the second processing resource. In the transaction mode, the processing circuitry may process a transaction of the first thread using the second processing resource, where the transaction comprises at least one processing operation of the first thread performed speculatively by the processing circuitry following a transaction start event, for which results are committed in response to a transaction end event. In this way, the second processing resource can be used either to support execution of a second thread or to support transactions processed as part of the first thread. In practice, it may be relatively rare that many threads need to be supported at the same time as processing transactions, and so by sharing resources between these functions, resources can be conserved.

The processing resources may take various forms. There may be several types of processing resource available for handling threads and transactions, and not all of them need to be shared between the thread mode and transaction mode. Some resources may be used only by additional threads or only for processing transactions. However, at least one processing resource may be used both in the thread mode and the transaction mode.

For example, the first processing resource and second processing resource may comprise first and second sets of storage elements respectively (which could be registers or areas in a cache or memory, for example). The first set of storage elements may store data for the first thread (e.g. register state generated by the first thread). The second set of storage elements may be used to store different data depending on the mode of the second processing resource. In the thread mode, the second set of storage elements may store data for a second thread. In the transaction mode, the second set of storage elements may store data for a transaction processed as part of the first thread.

For example, the data stored in the second set of storage elements during the transaction mode may be state restoration data which indicates a previous version of state data to be restored when an abort event occurs before the transaction end event. By reusing the second set of storage elements provided for handling a second thread to instead store the state restoration data for transaction of the first thread, or vice versa, the number of storage elements can be reduced.

Another example of the first and second processing resources may be identifiers associated with data values in a storage device (such as a cache for example). To support multithreading, the storage device may tag each data value with an identifier indicating which thread the data belongs to. The first processing resource may comprise a first value of the identifier which identifies data associated with the first thread, and the second processing resource may comprise a second value of the identifier. In the thread mode, the second value of the identifier may be used to identify data associated with the second thread, while in the transaction mode, it may be reused to indicate data associated with transactions. For example, the data associated with a transaction may be data indicating the speculative results of the processing operations performed for the transaction. By reusing certain bit patterns of the identifier to identify data as either belonging to a second thread or belonging to a transaction, depending on the current mode, fewer bits can be provided for the identifier of each data value. If a large amount of data is stored, with each value having a corresponding identification flag, then reducing the size of each flag by even one bit can significantly reduce the total size of the cache, to reduce circuit area and power consumption.

Similarly, an operation queue which queues pending operations to be performed by the processing circuitry may tag each operation with an associated operation identifier and the first/second processing resources may comprise first/second values of this operation identifier. The first value may represent operations associated with the first thread. The second value may represent operations associated with the second thread during the thread mode, and represent speculative operations within a transaction during the transaction mode. Again, this avoids the need to allocate different encodings of the operation identifier to each thread as well as to each transaction, allowing a smaller number of bits to be used for the identifier and therefore allowing less storage to be provided in the operation queue. For example, the operation queue may be a load/store queue which queues loads or store operations.

It will be appreciated that these are just some examples of resources which could be shared for supporting threads and transactions.

There are various ways of configuring the second processing resource to be in the thread mode or the transaction mode. In one example a configuration storage element (e.g. a control register) may be provided which stores configuration data indicating whether the second processing resource is in the thread mode or the transaction mode. The mode of the second processing resource can then be controlled by setting the configuration data in the configuration storage element.

In one example, the mode of the second processing resource may be configured statically. For example, the mode of the second processing resource could be set by the processing circuitry at boot time, when the processing circuitry is initially undergoing its boot process. For example boot software may set the configuration data to indicate which mode the second processing resource should be in. In such an example, it may not be possible to change the mode of the second processing resource at run time, when the processing circuitry is operational and executing application software. If the mode needs to be changed (e.g. a transaction needs to be executed, but there is no resource available in the transaction mode), then either the boot code itself, or some configuration data read by the boot program to control the mode of the second processing resource, may be changed, and then the processing circuitry may be rebooted.

In other examples, the mode of the second processing resource may be changed dynamically, e.g. at run time when the processing circuitry is executing application software. For example, the need for transactions may vary depending on the applications being executed. Requiring the processing circuitry to go offline and reboot in order to change the mode of the second processing resource may be too slow and costly. By allowing dynamic reconfiguration, a thread may be ejected from using the second processing resource in favour of processing a transaction of another thread, so that the system can respond more efficiently to the needs of the applications being executed.

For example, when the transaction start event occurs for the first thread at a time when the second processing resource is in the thread mode, then the processing circuitry may switch the second processing resource to the transaction mode so that the transaction can then be processed using the second processing resource. When switching to the transaction mode, there may be a state saving operation for saving state data associated with the second thread or the second processing resource to a storage device before commencing processing of the transaction. For example, if the second processing resource includes at least one storage element which currently stores data for a second thread, then this data can be saved to another location, to make space for the data used by the transaction. Similarly, where the shared resource is a particular identifier value currently being used to indicate data or operations associated with the second thread, then these data or operations can be discarded or saved, and the corresponding identifier value may then be used to signal data or operations associated with the transaction of the first thread.

In some cases the switch to the transaction mode may be carried out in hardware by mode switching circuitry detects the need to process a transaction and reconfigures the second processing resource accordingly (e.g. by writing control data to a configuration register, and/or managing any state saving).

In other examples, software executing on the processing circuitry may control the switch to the processing mode. For example, on encountering a transaction start event when the second processing resource is in the thread mode, the processing circuitry may signal an exception condition. A control program executing on the processing circuitry may respond to the exception condition to switch the second processing circuitry to the transaction mode (including any required state saving). The control program could be an exception handler for handling the signalled exception condition, or an operating system for managing either the first thread or the second thread for example.

The transaction start event and transaction end event may be signalled in various ways such as by an external signal for example. However, it can be convenient to provide a transaction start instruction and transaction end instruction in the code executed for the first thread to mark the start and end of a transaction respectively. In one example, successful execution of the transaction start instruction may depend on whether there is a resource provided in the transaction mode. If no resource is available in the transaction mode, then this may trigger an undefined instruction exception so that an exception handling routine or operating system may then reconfigure the second processing resource to be in the transaction mode so that the transaction can then be processed.

When the transaction is aborted or completed and no longer needs the second processing resource, the processing circuitry may switch the second processing resource back to the thread mode so that processing of the second thread can resume. This may include restoring some state data which was saved for the second thread when the second processing resource was previously switched to the transaction mode.

However, in some cases it may not be efficient to switch the resource back to the thread mode as soon as each transaction has completed. For example, there may be several transactions to be processed in succession, and so restoring the state of the second thread on completion of one transaction, only to save it again when the next transaction starts, may incur a latency and energy cost. It can be more efficient to allow several transactions to compete in the transaction mode before returning to the thread mode. One way of doing this is to defer switching the second processing resource back to the thread mode until a predetermined condition is satisfied following completion of the processing of the transaction. For example, the condition may be the elapse of a predetermined amount of time or a given number of processing cycles without commencing processing of another transaction, or could be the completion of a predetermined number of processing operations or instructions of the first thread without encountering another transaction. By delaying switching back for a time, it is more likely that several transactions can be processed in a row without intervening state saving/restoring operations, to improve energy efficiency. The particular condition to be satisfied before the second processing resource switches back to thread mode may be defined in configuration data stored within a configuration storage element of the apparatus. This allows the delay before switching back to thread mode to be adjusted depending on the expected frequency of transactions.

While the examples above discuss a single second processing resource, in some cases there may be several such resources having a thread mode and a transaction mode. Similarly, some systems may have more than one of the first processing resource, each for supporting a different thread. Each second processing resource may be switched between the thread mode and transaction mode either statically or dynamically as discussed above. In this way, the apparatus may scale up or down the number of threads supported and the number of threads which may process transactions. For example, there may be four sets of resources which could be configured in several different ways, e.g. (1) all four resources in thread mode for handling four separate threads, (2) one of the resources in transaction mode so that three threads are supported together with transactions for one of the three threads at a time, or (3) two sets of resources in transaction mode so that two threads are supported, both of which may be executing transactions. Hence, the balance between the number of hardware threads supported and the ability to process transactions within each thread can be varied as required for a given application.

In some cases the first processing resource used by the first thread may not support a transaction mode, and may effectively always be in the thread mode. This approach may reduce the amount of configuration data required. It may not be justified to provide configuration overhead for switching every resource between the thread mode and transaction mode, since typically at least one resource would need to operate in the thread mode at a given time, so that at least one thread can be executed.

Nevertheless, if desired it would be possible to provide a number of resources which may each be placed in either the thread mode or the transaction mode. Hence, in some cases the first processing resource may also support both the thread mode and a transaction mode (in the same way as the second processing resource). While it may required that at least one resource is currently provided in the thread mode, it may not matter which resource is selected for this, and some systems may support reconfiguration of each set of resources.

Figure 1:
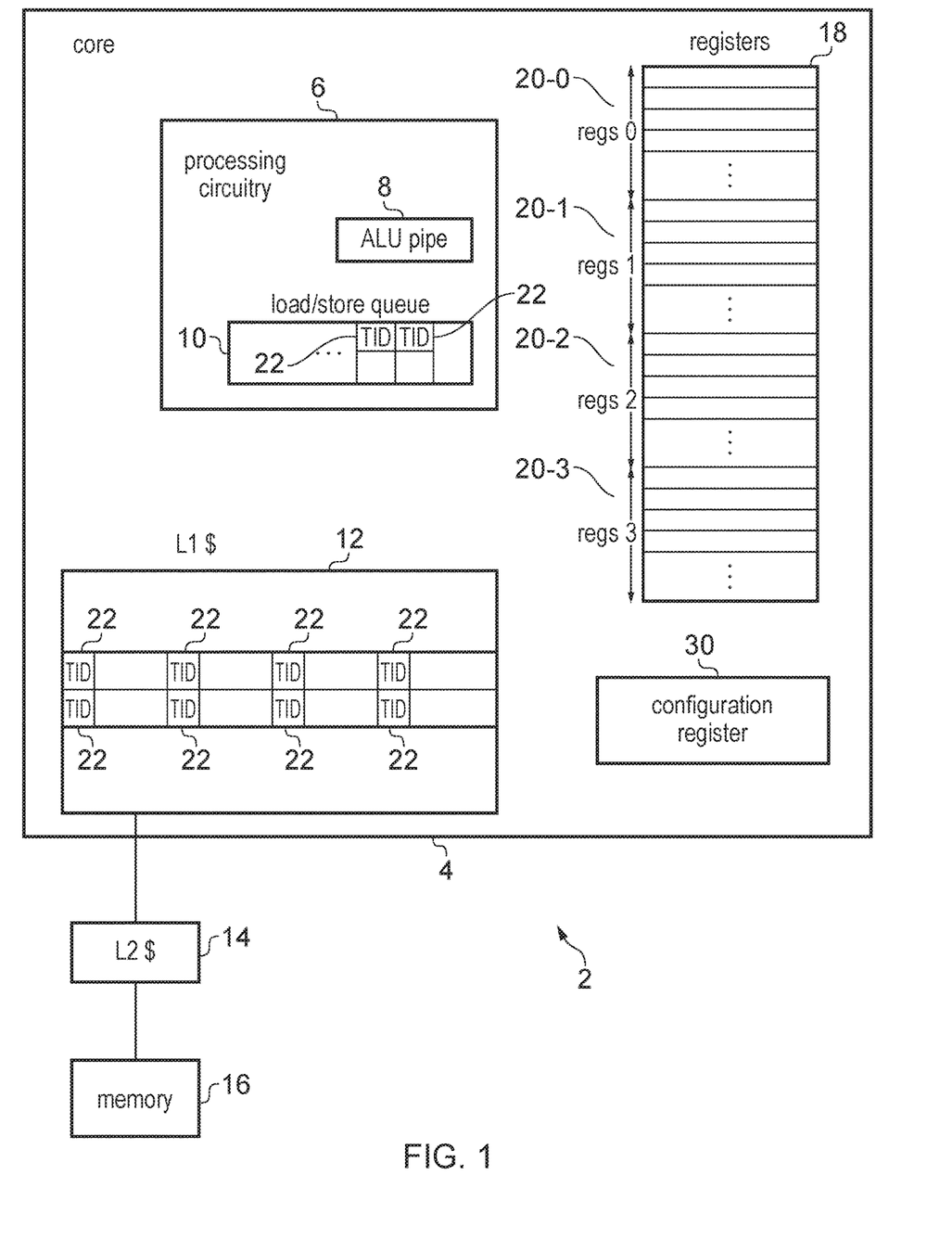
FIG. 1 schematically illustrates an example of a data processing apparatus having a processing resource which has a transaction mode and a thread mode.

FIG. 1 illustrates an example of a data processing apparatus 2 having a processor core 4 comprising processing circuitry 6 for carrying out data processing operations. For example the processing circuitry may include an arithmetic/logic unit (ALU) pipeline 8 for carrying out arithmetic and logical operations and a load/store queue 10 for queuing load or store operations for accessing data in a memory hierarchy. The memory hierarchy may include a level 1 (L1) cache 12 local to the processor core 4 as well as a level 2 (L2) cache 14 and memory 16. Load operations executed from the load/store queue 10 may trigger data values to be fetched from the L1 cache 12, L2 cache 14 or memory 16 and placed in registers 18, while store operations may cause data from the registers 18 to be placed in one of the caches 12, 14 or memory 16 of the memory hierarchy. Various caching policies may be used to control which data should be cached in the L1 and L2 caches 12, 14.

The processing circuitry 6 may support processing of several independent threads of execution using various hardware resources accessible to the processing circuitry 6. For example, the registers 18 may include multiple sets 20 of registers (e.g. 4 sets in this example) which may each be used to store data arising during processing of a corresponding thread. The respective sets of registers 20-0, 20-1, 20-2, 20-3 could be implemented as separate banks of registers, or as different subsets of registers within the same bank. Also, data stored in the L1 cache 12 and operations pending in the load/store queue 10 may be tagged with a thread identifier (ID) 22 indicating which thread the data or operations belong to, and this thread ID may be used by the processing circuitry 6 and any control mechanism such as a cache controller to determine which data should be accessible or modifiable by the processing circuitry 6 when performing the processing operations for each thread. By providing hardware support for multiple threads in this way, the processing circuitry 6 can quickly switch between operations from different threads without needing to perform additional state saving or other operations which may cause a delay in switching between threads. It will be appreciated that there may be other resources used for supporting threads.

Some of these resources may have both a thread mode and a transaction mode, so that they can be reconfigured to support processing of transactions instead of processing an additional thread. A configuration register 30 may store configuration information indicating whether a resource is in the transaction mode or the thread mode. For example, instead of supporting a fourth thread, the fourth register set 20-3 and the thread ID value of 3 may be used to handle transactions on behalf of one of the other threads handled using register sets 20-0, 20-1 or 20-2 and thread IDs 0, 1 or 2. A transaction is a set of operations which is bounded by a transaction start instruction and transaction end instruction. Between the start and the end of the transaction, any data access operations and other processing operations of that thread may be performed speculatively by the processing circuitry 6, and the results of the speculative operations may not be committed to state until the end of the transaction.

At the start of the transaction, a snapshot of the register state in the register set 20-0, 20-1, 20-2 for the thread triggering the transaction may be saved, and placed in the fourth register set 20-3 operating in the transaction mode. Alternatively, the register state for the thread could be saved gradually to the registers 20-3 with each register's value being saved to the registers 20-3 only when it needs to be updated speculatively during the transaction, to avoid needing to save registers which are not actually updated during the transaction. If an abort event occurs (such as a conflict between an address accessed by the transaction and another data access accessing the same address), the saved register state in registers 20-3 can be restored to the set of registers 20-0, 20-1, 20-2 associated with the thread performing the transaction, to rewind that set of registers to the state they were in when the transaction started. By aborting transactions when another process attempts to access the same data as the transaction, it can be ensured that the transaction will only complete if it has had exclusive access to all the data it needs, so that there will be no hazards caused by simultaneous access to data by different processes.

Hence, to support transactions, some additional storage is provided to store the state restoration data which represents saved register state to be restored if there is an abort event. By reusing one of the register sets 20-3 that would otherwise store data for an additional thread, to instead store the state restoration data, it is not necessary to provide additional storage.

Similarly, during processing of transactions, the results of data access operations (load/store operations) may be indicated as speculative in the L1 cache 12, to indicate that they should not be written back to the L2 cache 14 or memory 16 until the transaction completes. If a transaction aborts, the speculative data can be invalidated or discarded. If the transaction completes, the speculative data can be committed by no longer marking this data as speculative. Rather than requiring an additional bit to indicate whether data is speculative, one of the thread ID values can be reused to indicate speculative data associated with a transaction. For example, when register set 20-3 is reallocated for storing the state restoration data for a transaction, the corresponding thread ID 3 can be used to mark speculative data, since the corresponding Thread 3 will not be able to make progress anyway at this time. Hence, another type of resource which can be shared between a thread mode and a transaction mode may be a particular value of the thread ID which may signal data associated with a given thread during the thread mode, and signal speculative results of a transaction during the transaction mode. The thread IDs 22 in the load/store queue 10 may be reallocated for transactions in a similar way.

In summary the processing circuitry 6 has access to a number of sets of resources. For example, each set of resources may comprise one of the sets of registers 20 and one of the possible values for the thread ID 22 used by the cache 12 and load/store queue 10. For at least some of these sets of resources, the resources can be configured in the transaction mode or the thread mode, and this reconfiguration may be done statically or dynamically. FIGS. 2 to 5 show various examples of doing this.

Figure 2:
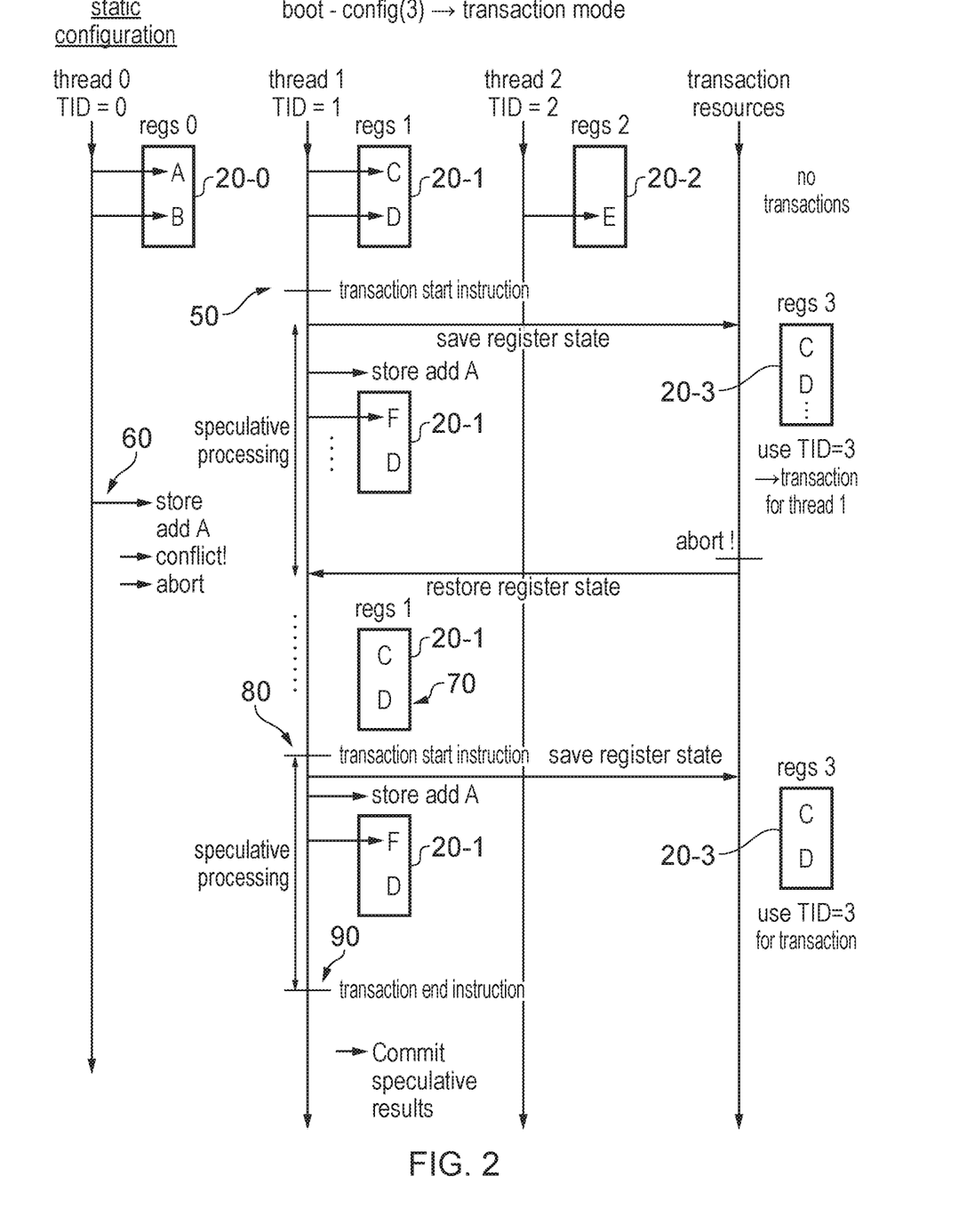
FIG. 2 illustrates an example of using the processing resource in the transaction mode.

FIG. 2 shows an example of using a set of resources (register set 20-3 and the thread ID value of 3) in the transaction mode. This example uses static configuration of the current mode of the resources. At boot time, the boot code executed by the device sets the configuration register 30 to indicate that the resources are to be used in the transaction mode. Once booted, processing begins and the other sets of resources (register sets 20-0, 20-1, 20-2 and thread IDs 0, 1, 2) are used for processing three threads 0, 1, 2 respectively. For example, for Thread 0 the processing circuitry 6 carries out any operations marked with thread ID 0, marks data in the L1 cache 12 associated with this thread using thread ID 0, and uses the set of registers 20-0 to store any results of data processing. Threads 1 and 2 are handled in a similar way. The register set 20-3 and thread ID value 3 are not used at this time because there are no transactions to be processed.

At step 50 labelled in FIG. 2, a transaction start instruction is encountered in the processing performed for Thread 1. This causes the register state from register set 20-1 associated with Thread 1 to be saved to the register set 20-3 operating in the transaction mode. This provides a backup of the current state of Thread 1 which can be restored if there is an abort. Thread 1 then commences speculative processing of operations, which may cause the values in registers 20-1 to change, and may also cause speculative data to be placed in the L1 cache 12 in response to load/store operations.

At step 60, before the transaction reaches the transaction end instruction, Thread 0 attempts to access an address A which is the same as an address A accessed during the transaction of thread 1, and so a conflict is detected. For example, the processing circuitry 6 may maintain a tracking structure which tracks the addresses accessed during the transaction, and each address accessed by other threads may be compared against the tracking data to detect whether there is a conflict. If a conflict is detected, an abort event occurs. The transaction is aborted, and the data stored in the register set 20-3 operating in the transaction mode is used to restore the previous register state to the register set 20-1 associated with Thread 1. Hence, as shown at point 70 of FIG. 2, the register set 20-1 returns to the same values which were stored before the transaction start instruction. Also, on aborting the transaction, the data marked as speculative in the L1 cache 12 using the thread ID 3 is discarded or invalidated.

At step 80 of FIG. 2, Thread 1 attempts to execute the transaction again. The transaction start instruction is executed again, and this causes saving of register state in the same way as at step 50. Again, processing is performed speculatively for the transaction of Thread 1, and any speculative results may be marked in the cache 12 using the thread ID 3. This time no abort event occurs and at step 90 of FIG. 2 the transaction end instruction is executed for Thread 1. The speculative state is then committed. For example the data having thread ID 3 may be updated to have a thread ID of 1, to indicate that this data is now non-speculative state associated with the Thread 1 which performed the transaction. Data can be written back to the L2 cache 14 or memory 16 if required. Also, optionally any data stored in the set of registers 20-3 may be discarded at this stage.

Hence, as shown in FIG. 2, by configuring one of the sets of registers 20-3 and the thread ID 3 in the transaction mode, this allows another thread to execute a transaction speculatively, which can be useful for ensuring that the transaction completes atomically without interference from other threads.

Figure 3:
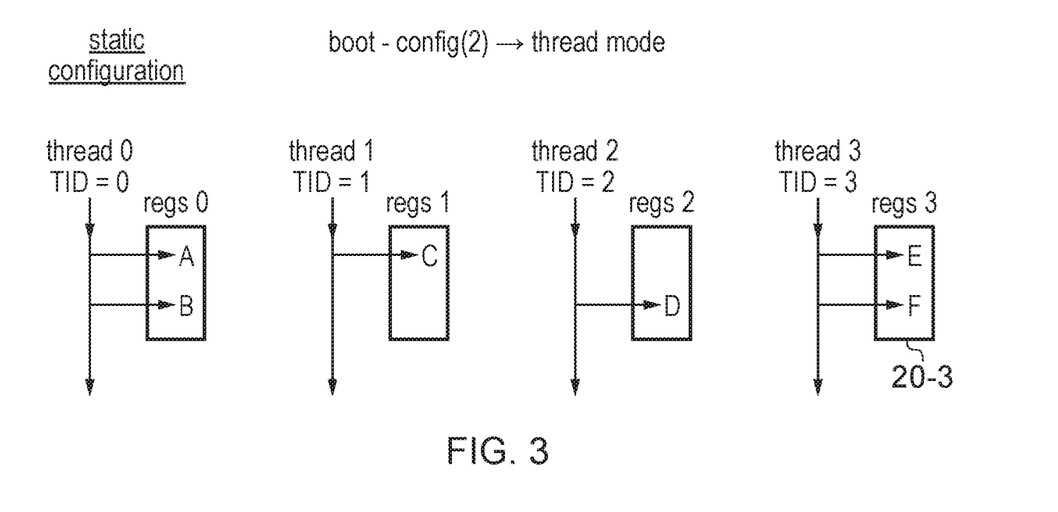
FIG. 3 shows an example of using the resource in the thread mode.

FIG. 3 shows another example in which the boot configuration code configures the fourth set of resources to operate in the thread mode instead of the transaction mode. This time, the register set 20-3 is used to store data associated with a fourth thread (Thread 3) and similarly the thread ID value of 3 marks data in the L1 cache 12 and operations in the load/store queue 10 which belong to Thread 3. In this configuration, no transactions can be processed by the apparatus. If one of the threads encounters the transaction start instruction, then this may trigger an exception because the transaction cannot be processed and then some other mechanism may be used to be process the operations of the transaction. For example a locking mechanism may be used to provide a thread with exclusive access to one or more addresses, and then that thread may perform a series of non-speculative operations using the locked addresses (in this case there is no need for resources in the transaction mode because there is no speculative execution).

Figure 4:
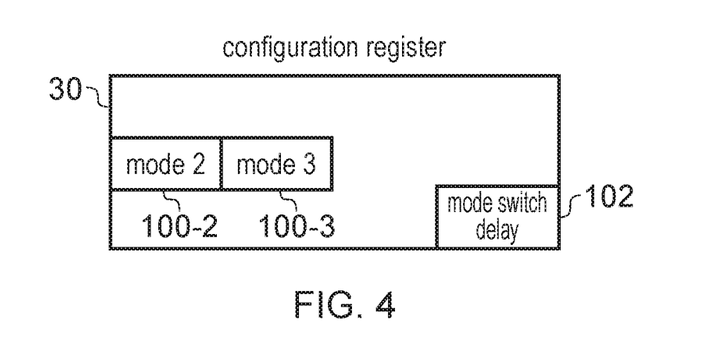
FIG. 4 shows an example of a configuration register for storing configuration data.

FIG. 4 shows an example of data stored by the configuration register 30. For at least some of the sets of resources, the configuration register may have mode defining data 100 indicating whether the corresponding set of resources is in the thread mode or the transaction mode. In this example, the first and second sets of resources 0 and 1 cannot be reallocated and are always used for handling different threads. However, the third and fourth sets of resources 2 and 3 (comprising registers sets 20-2, 20-3 and thread IDs 2 and 3) can be switched between the thread mode and the transaction mode, by setting the corresponding mode defining data 100-2, 100-3 in the configuration register. In the static case shown in FIGS. 2 and 3, once set at boot time the configuration data 100 cannot be changed unless the system is rebooted.

It is also possible to perform dynamic mode switching so that during operation of the processing circuitry 6 while executing applications, the mode of the resources can be switched. In this case, the configuration register 30 may also include data 102 specifying a mode switching delay which specifies how long the resources should remain in the transaction mode following completion of a transaction before switching back to the thread mode. This will be discussed in more detail with respect to FIG. 5.

Figure 5:
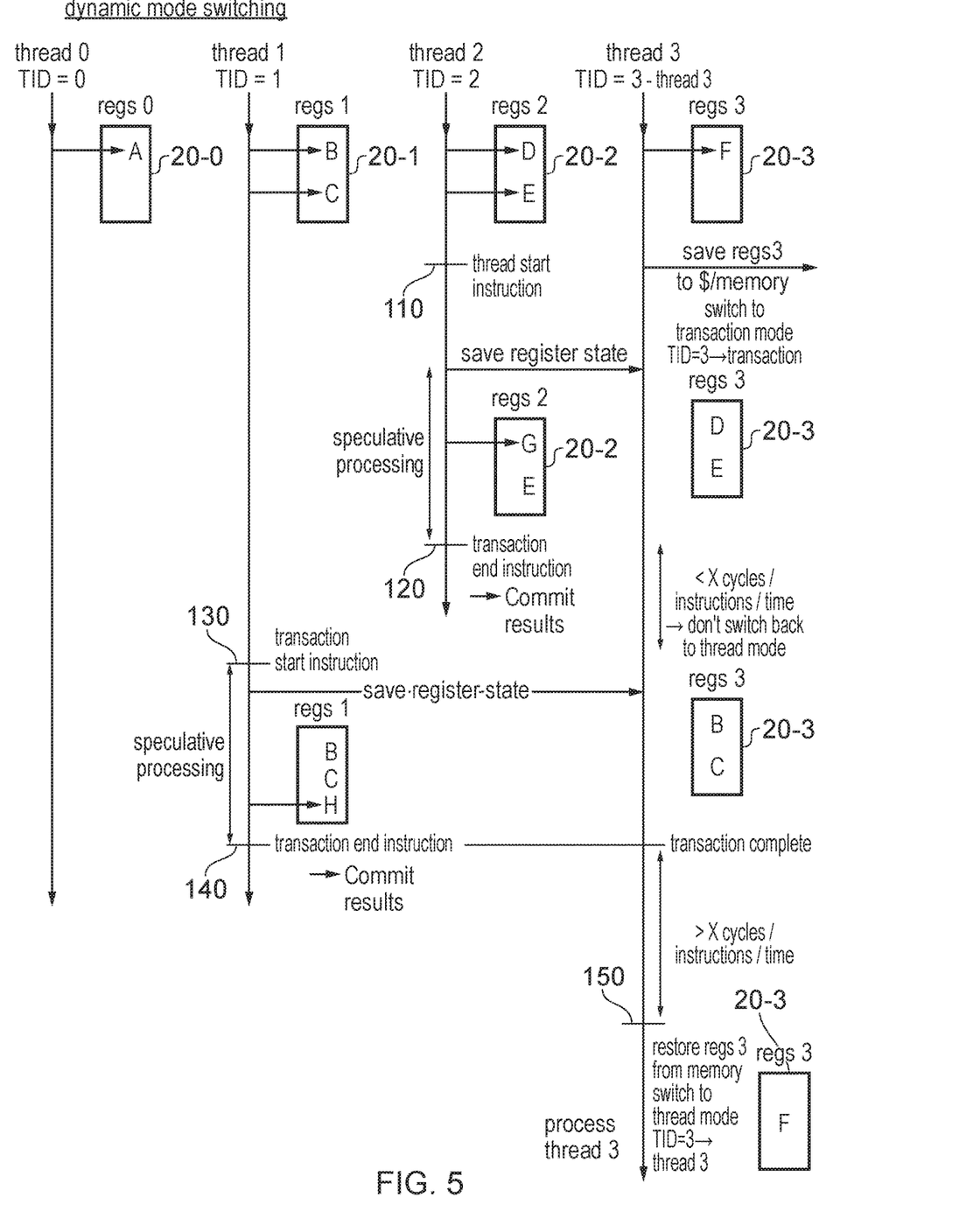
FIG. 5 shows an example of dynamically switching the resource between the thread mode and the transaction mode.

In FIG. 5, the different sets of resources are initially all in the thread mode so that four different threads 0, 1, 2, 3 are supported with each thread having a corresponding thread ID and using a corresponding set of registers 20 to store results of that thread.

At step 110 of FIG. 5, Thread 2 encounters a start instruction and requests use of resources for handling transactions. At this point Thread 3 may be ejected from using registers 20-3 and thread ID 3 to make resources available for handling the transaction for thread 2. Hence the values in registers 20-3 associated with thread 3 may be saved to the memory system 12, 14, 16, and the configuration data 100-3 in the configuration register 30 may be changed to indicate that the set of resources 3 is now in the transaction mode. This may be done in various ways. For example some mode switching circuitry in the processing circuitry 6 may detect the transaction start instruction and reconfigure the set of resources 3 accordingly. Alternatively, the transaction start instruction may trigger an exception if the resources are not already in a transaction mode and an exception handler executed in response to the exception may trigger an operating system (associated with either the thread 2 which encountered the transaction start instruction or the thread 3 being ejected to make way for transactions) to perform the reconfiguration to switch the mode of the set of resources.

Having switched the mode of the resources previously used for Thread 3, the register state associated with Thread 2 can then be saved to the registers 20-3 which are now in the transaction mode. From this point on the thread ID value of 3 indicates speculative data associated with a transaction in the cache 12 or speculative operations pending in the load/store queue 10. The transaction begins to be processed by Thread 2 and this may cause data in the set of registers 20-2 associated with Thread 2 to be changed, and may cause load/store operations to speculatively update data in the L1 cache 2. In this example there is no abort condition, but if an abort occurred then the data in registers 20-3 is used to restore the state to register set 20-2 and the thread ID values of 3 can be used to identify which operations in the load store queue 10 and which data in the cache 12 to invalidate when aborting the transaction.

However, in this particular example no such abort occurs. At step 120 of FIG. 5, a transaction end instruction is encountered, and at this point the results of the transaction are committed. The thread IDs of 3 in the cache are changed to 2 to indicate that this data is now non-speculative data associated with Thread 2. The processing circuitry 6 waits for a delay period to expire. The delay period is specified by the mode switching delay parameter 102 in the configuration register 30. The delay may be specified as a certain period of time, a certain number of cycles, or a certain number of instructions to be executed. If, before the end of the delay period, another transaction start instruction is encountered by one of the threads 0, 1, 2 then the set of resources 3 remains in the transaction mode and the new transaction is then processed. For example, at step 130 of FIG. 5 a transaction start instruction is encountered by Thread 1 and this causes the registers 20-3 to be used for saving register state associated with Thread 1. The transaction is then processed, and once the transaction completes at step 140, speculative results are committed in a similar way to the previous transaction. At step 150, it is determined that a sufficient delay has elapsed following the completion of the last transaction and so at this point the processing circuitry 6 switches the set of resources 3 back to the thread mode. This may be done in response to a software exception or by mode switching circuitry. The state associated with Thread 3 which was previously saved to memory at step 110 is now restored to registers 20-3, so that these registers are returned to the state they were in when the resources were switched to the transaction mode. The thread ID of 3 is now used again for indicating data and operations associated with Thread 3. Thread 3 can now continue processing.

Hence, by implementing a delay between completion of processing a transaction and switching the resource back to the thread mode, the overhead associated with saving state to memory and restoring it again when switching between the thread mode and transaction mode can be reduced, since this allows multiple transactions to be processed in succession while remaining in the transaction mode.

With this approach, then as more threads require transactions the resources can be switched to the transaction mode and if no transactions are necessary then more threads can be executed by switching resources to the thread mode. For example, if both Threads 0 and 1 require transactions then the sets of resources 2 and 3 could both be used in the transaction mode.

Figure 6:
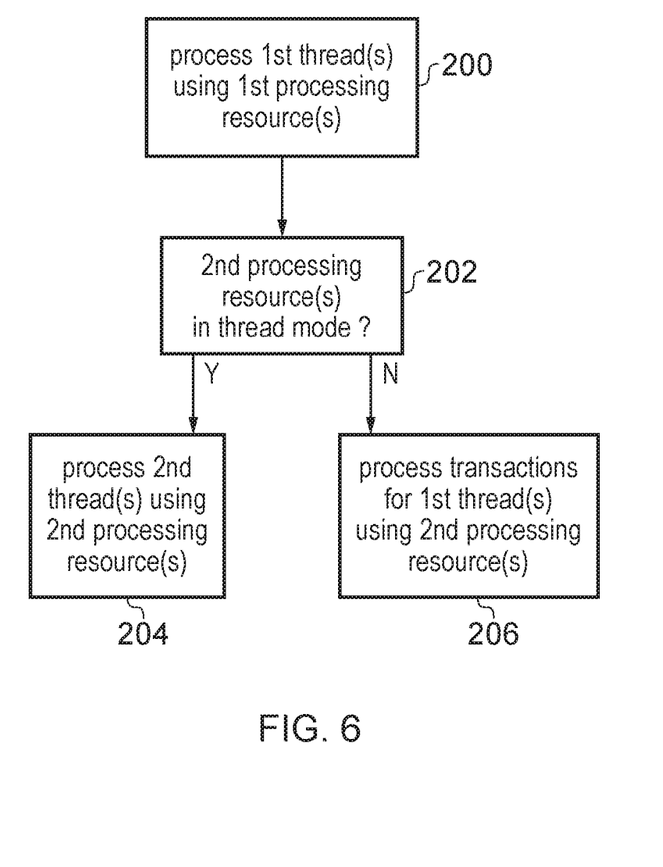
FIG. 6 illustrates a method of processing data.

FIG. 6 shows a method of processing data. At step 200 a first thread is processed using a first processing resource, such as a corresponding set of registers 20 and a corresponding value of the thread identifier 22 in the cache 12 or load store queue 10. At step 202, it is determined whether the second processing resource is in the thread mode. If so, then the second processing resource may be used to process a second thread at step 204. If the second processing resource is not in the thread mode, then at step 206 it may be used for processing transactions of the first thread.

In summary, transactions may take a full register snapshot at the beginning of the transaction and also may use additional bits per cache line to perform data versioning and transactional conflict detection. We propose to reuse these resources to switch a core between running transactions and running multiple hardware (HW) threads.

Transactional Memory Background

Transactional memory (TM) is a mechanism that groups instructions executed on a CPU into transactions, by way of a start and end marker instruction, often called speculate/commit, or txbegin/txend. The start instruction signals to the processor that a transaction is about to start and so the following instructions will be part of the transaction. The end instruction signals that the transaction is about to end and that the following instructions are not anymore part of the transaction. There exist many academic and industry proposals for TM.

The instructions that are grouped into transactions flow through the pipeline of the microprocessor as before, but at transaction begin, a snapshot of the register and memory state is made. This snapshot of the register and memory state allows rollback of the transaction back to the initial state upon detection of an abort reason. The snapshot comprises a register file snapshot and a mechanism to undo modifications that have been made to memory during the transaction. If the transaction executes the ending instruction, it cannot abort any longer and the snapshot is discarded and the transaction commits.

Reasons for aborts may vary, but the most significant is that of data conflicts between data accessed in one transaction and other memory accesses. Generally, the aim is to disallow any concurrent writes to memory accessed in a transaction, and concurrent reads from data that has been modified in an ongoing transaction. If a transaction performs this conflict detection and aborts upon conflict, this transaction will execute in isolation/atomically from other observers. The advantage is that these transactions can be used in multi-threaded applications where synchronization is important. Due to the dynamic nature, two transactions can execute concurrently (avoiding serial bottlenecks of locks) if they do not conflict with one another. In most cases, actual data conflicts are expected to be rare, so transactional memory can unlock additional performance of multi-threaded applications.

Transactional Register State Storage

If a transaction starts, it creates a checkpoint of the current register state because if the transaction aborts, it will need to roll back all modifications to the register state. We propose to have an additional architectural register file (or one of double the original size) and use that to run an additional thread on the CPU if no transactions are being used.

Transactional Conflict Detection/Versioning

Similarly, transactional data versioning and conflict detection require additional bits in the caches/load-store-queues, which may be costly to maintain. We propose to be able to repurpose bits that are in place to track per-HW-thread state of cache lines and LSQ entries and use them for tracking the required TM properties. We believe these bits will already be wired into the right decision units.

Static Reconfiguration

In a simple static reconfiguration scenario, boot system software can toggle the mode of the CPU by trading number of concurrently running threads for number of concurrently running transactions. A four-way threaded CPU may for example be configured to run only three-threads concurrently and allows the usage of a single in-flight transaction at a time. For the register file this means that of the quadrupled architectural register file, only three copies are used for threading, which the fourth will hold the register state at the beginning of a transaction. In case of a transaction abort, the core will copy/switch to this register file and resume execution from the beginning of the transaction/an abort handler.

Dynamic Reconfiguration

Statically configuring the CPU can be too crude if the application mix changes and rebooting/costly reconfiguration through CPU offlining in the OS is not applicable. Another option is to allow dynamic reconfiguration by "ejecting" a hardware thread to free its resources to HTM.

This can be achieved by sending an exception to the operating system (OS) on the displaced thread whenever another thread on a core wants to use HTM resources. The exception would have the OS store the thread context in memory through a context-save handler, and then remove the hardware thread (virtual core) from the scheduler temporarily. A notification mechanism from the CPU to the OS will tell the OS when the resources for another HW thread become available again, that is, after HTM transactions have completed. There is a separate register that holds a number of non-transactional instructions that need to complete before the notification is sent, so that frequent transactions can execute without suspending/resuming the other thread context for every transaction.

A faster option is to give dedicated memory storage to the CPU so that it can perform the thread suspension into a dedicated memory region itself directly whenever transactional memory is required. The thread suspension will happen at a more coarse granularity than actual transaction commit/abort, so it makes a difference whether the context of an offlined HW thread is stored in that memory (on HTM vs SMT phase changes) rather than storing the transactional register snapshot in that memory region (for every transaction). That way, the OS needs to be only notified for bookkeeping purposes and its thread saving code path is not on the critical path for a transaction start.

Finally, a third option is to have the transaction start operation fail if there are no HTM resources available and the application call into a reconfiguration handler, like so:

```
    if (tx_begin != SUCCESS) {
    if (tx_abort_code == NO_RESOURCE) {
        call_OS_to_convert_HW_thread_to_HTM_resource( );
        goto retry;
    }
    ...
}
/* in the transaction now */
...
tx_commit( );
...
call_OS_to_convert_HTM_resource_to_HW_thread( );
```

Extensions

This scheme may allow a 4-way threaded CPU to run with only three HW threads and allow a single transaction to execute, or instead scale down to two HW-threads, both of which can execute transactions concurrently.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
a first set of registers;
a second set of registers; and
processing circuitry to perform data processing;
wherein the processing circuitry has access to the first set of registers and the second set of registers;
in a transaction mode of the second set of registers:
    the processing circuitry is configured to process a transaction using the first set of registers, the transaction comprising one or more data processing operations performed speculatively by the processing circuitry following a transaction start event, for which results of the speculatively performed data processing operations are committed in response to a transaction end event;
    wherein in the transaction mode, the second set of registers are configured to store restoration data for restoring to the first set of registers when an abort event occurs before the transaction end event; and
in a thread mode of the second set of registers:
    the processing circuitry is configured to process a first thread using the first set of registers to store a first set of state data for the first thread; and
    the processing circuitry is configured to process a second thread using the second set of registers to store a second set of state data for the second thread;
wherein said second set of registers are configured to be used for storing the restoration data in the transaction mode and for storing the second set of state data in the thread mode.

2. The apparatus according to claim 1, wherein in the transaction mode, when an abort event occurs before the transaction end event, the processing circuitry is configured to perform a state restore operation to restore the restoration data to the first set of registers.

3. The apparatus according to claim 1, comprising a configuration storage element to store configuration data indicative of whether the second set of registers is in the thread mode or the transaction mode.

4. The apparatus according to claim 1, wherein the processing circuitry is configured to set whether the second set of registers is in the thread mode or the transaction mode at boot time.

5. The apparatus according to claim 1, wherein when the transaction start event occurs and the second set of registers is in the thread mode, the processing circuitry is configured to switch the second set of registers to the transaction mode.

6. The apparatus according to claim 5, wherein said switch of the second set of registers to the transaction mode comprises a state saving operation to save the second set of state data associated with the second thread or the second set of registers to a storage device before the processing circuitry commences processing of the transaction using the second set of registers.

7. The apparatus according to claim 5, wherein the processing circuitry is configured to signal an exception condition in response to said transaction start event when the second set of registers is in the thread mode; and
    a control program executing on the processing circuitry is responsive to the exception condition to switch the second set of registers to the transaction mode.

8. The apparatus according to claim 7, wherein said control program comprises a control program for managing the first thread.

9. The apparatus according to claim 7, wherein said control program comprises a control program for managing the second thread.

10. The apparatus according to claim 5, wherein the processing circuitry comprises mode switching circuitry configured to switch the second set of registers to the transaction mode in response to said transaction start event when the second set of registers is in the thread mode.

11. The apparatus according to claim 1, wherein following completion of processing of the transaction when the second set of registers is in the transaction mode, the processing circuitry is configured to switch the second set of registers to the thread mode.

12. The apparatus according to claim 11, the processing circuitry is configured to defer switching the second set of registers to the thread mode until a predetermined condition is satisfied following completion of processing of the transaction.

13. The apparatus according to claim 12, wherein the predetermined condition comprises one of:

the elapse of a predetermined amount of time or a predetermined number of processing cycles without commencing processing of another transaction; and completion of a predetermined number of processing operations following completion of processing of the transaction without commencing processing of another transaction.

14. A data processing method for an apparatus comprising a first set of registers and a second set of registers, and processing circuitry having access to the first set of registers and the second set of registers, the method comprising:

in a transaction mode of the second set of registers:

processing a transaction with the processing circuitry using the first set of registers, the transaction comprising one or more data processing operations performed speculatively by the processing circuitry following a transaction start event, for which results of the speculatively performed data processing operations are committed in response to a transaction end event; and storing, in the second set of registers, restoration data for restoring to the first set of registers when an abort event occurs before the transaction end event; and in a thread mode of the second set of registers:

processing a first thread with the processing circuitry using the first set of registers to store a first set of state data for the first thread; and processing a second thread with the processing circuitry using the second set of registers to store a second set of state data for the second thread;

wherein said second set of registers are configured to be used for storing the restoration data in the transaction mode and for storing the second set of state data in the thread mode.

* * * * *